Patented June 16, 1931

1,810,009

UNITED STATES PATENT OFFICE

IVAN GUBELMANN, HENRY J. WEILAND, AND OTTO STALLMANN, OF SOUTH MILWAUKEE, WISCONSIN, ASSIGNORS, BY MESNE ASSIGNMENTS, TO NEWPORT CHEMICAL CORPORATION, A CORPORATION OF DELAWARE

4'-SULPHO-2-BENZOYL-5-AMINO-BENZOIC ACID

No Drawing.  Application filed July 2, 1927.  Serial No. 203,260.

This invention relates to 4'-sulpho-2-benzoyl-5-amino-benzoic acid and to a process of making the same.

It is an object of this invention to provide a simple and economical process of preparing 4'-sulpho-2-benzoyl-5-amino-benzoic acid.

Other and further important objects of this invention will become apparent from the disclosures in the following description and appended claim.

We have now discovered that 4'-sulpho-2-benzoyl-5-nitro-benzoic acid, described and claimed in our co-pending application Serial No. 203,259, filed July 2, 1927, can be reduced under certain conditions to 4'-sulpho-2-benzoyl-5-amino-benzoic acid. The reduced body is an intermediate for valuable dyestuffs and on account of the ease with which the reduction takes place according to our process, it furnishes an economically practicable method of obtaining this product.

Our preferred method of reduction is that of reducing the nitro body with iron powder and acetic acid, but we do not desire limiting our method to any particular procedure as we have found that other reducing agents, such as sodium sulphide, electrolytic hydrogen, and the other common reducing agents, give us the same end product.

The reaction illustrating our process is probably best expressed by the following chemical equation:

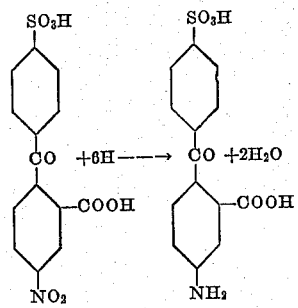

4'-sulpho-2-benzoyl-5-amino-benzoic acid is a crystalline solid which may be easily recrystallized from hot water in the form of large white crystals containing water of crystallization. It is easily soluble in dilute caustic soda, sodium carbonate or ammonia solution, but sparingly soluble in cold water and dilute mineral acids. It is practically insoluble in alcohol, glacial acetic acid or other organic solvents. In concentrated sulphuric acid it dissolves with a red color and if heated up, closes the ring to form 2-amino-anthraquinone-7-sulphonic-acid.

Without limiting our invention to any particular procedure, the following example, in which parts by weight are given, illustrates the application of our invention in the preferred form:

373 parts of 4'-sulpho-2-benzoyl-5-nitro-benzoic acid (mono sodium salt) is suspended in about 3000 parts of hot water. This mixture is then added over a period of 3 to 4 hours into an agitated mass, held at a temperature of 93 to 97° C., containing 2000 parts of water, 750 parts of powdered iron and 75 parts of acetic acid. The temperature of the reduction mass is held about one hour at 95 to 97° C. and then neutralized by the addition of about 175 parts of sodium carbonate. The iron sludge is now filtered off and washed with about 1000 parts of hot water. The combined mother liquor filtrate and wash are acidified by the addition of a small amount of acid, such as sulphuric or hydrochloric, whereby the product precipitates. The product, 4'-sulpho-2-benzoyl-5-amino-benzoic acid, is filtered off, washed with cold water and dried. The yield is practically quantitative.

While we prefer to use as the starting material the mono sodium salt, either the disodium salt or the free acid of 4'-sulpho-2-benzoyl-5-nitro-benzoic acid may be used also. Instead of neutralizing the reduction mass, as in the above example, the excess iron may be filtered from the hot acid solution and the hot filtrate cooled until the product precipitates out.

We are aware that numerous details of the process may be varied through a wide range without departing from the principles of this invention, and we therefore, do not purpose limiting the patent granted hereon, otherwise than necessitated by the prior art.

We claim as our invention:

As a new article of manufacture, 4'-sulpho- 2-benzoyl-5-amino-benzoic acid, having most probably the following chemical constitution, in which X represents O or an integer:
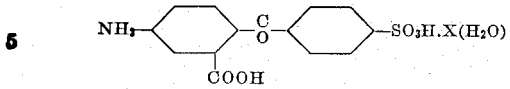
In testimony whereof we have hereunto subscribed our names at Carrollville, Milwaukee County, Wisconsin.
IVAN GUBELMANN.
HENRY J. WEILAND.
OTTO STALLMANN.